March 13, 1928.  H. SMITH  1,662,082
DEMOUNTABLE WINDOW
Filed Jan. 5, 1925  3 Sheets-Sheet 1
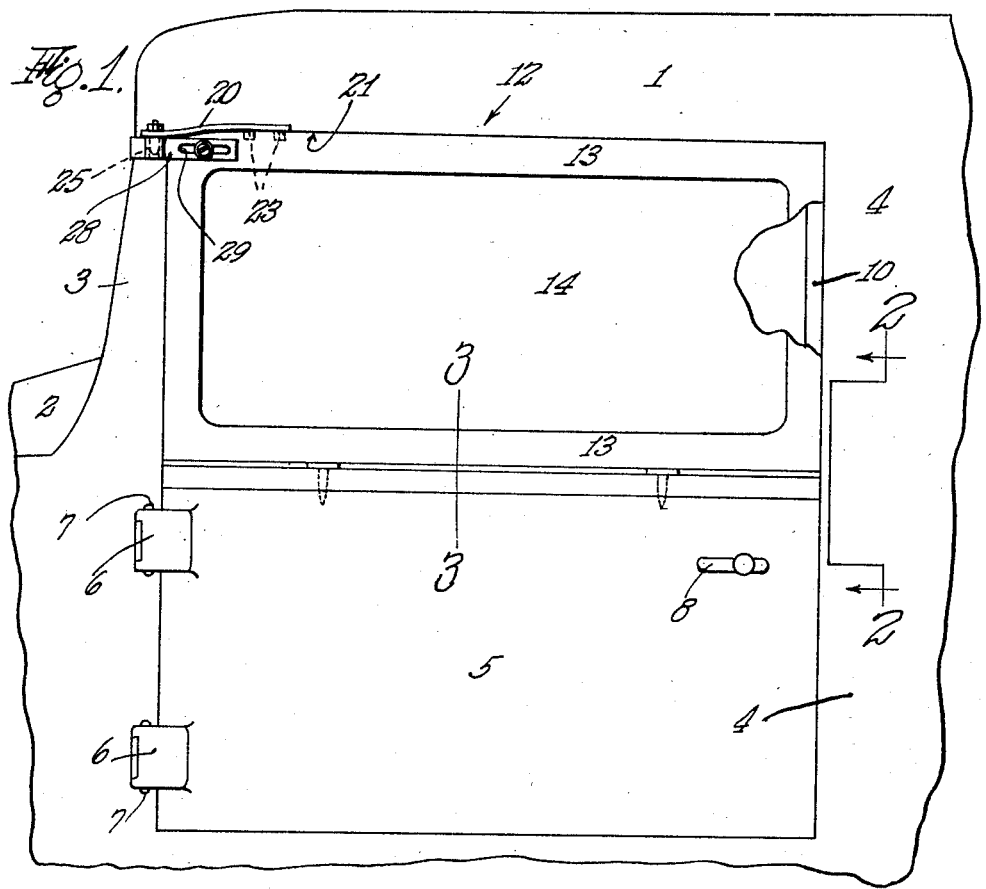
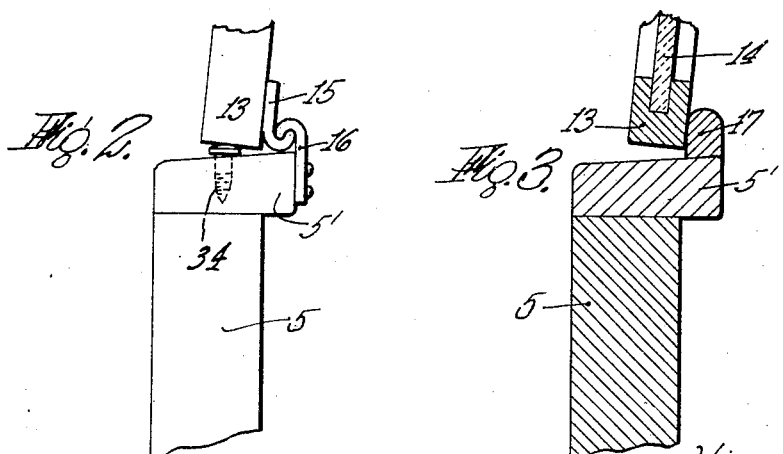
INVENTOR
Hinsdale Smith
BY Chapin & Neal
ATTORNEYS March 13, 1928. 1,662,082
H. SMITH
DEMOUNTABLE WINDOW
Filed Jan. 5, 1925 3 Sheets-Sheet 2
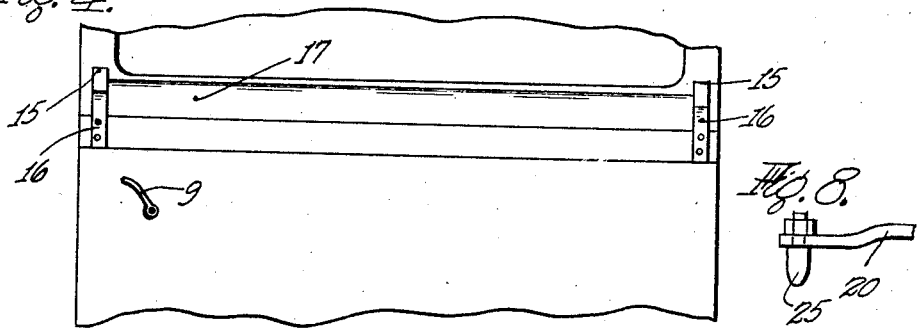
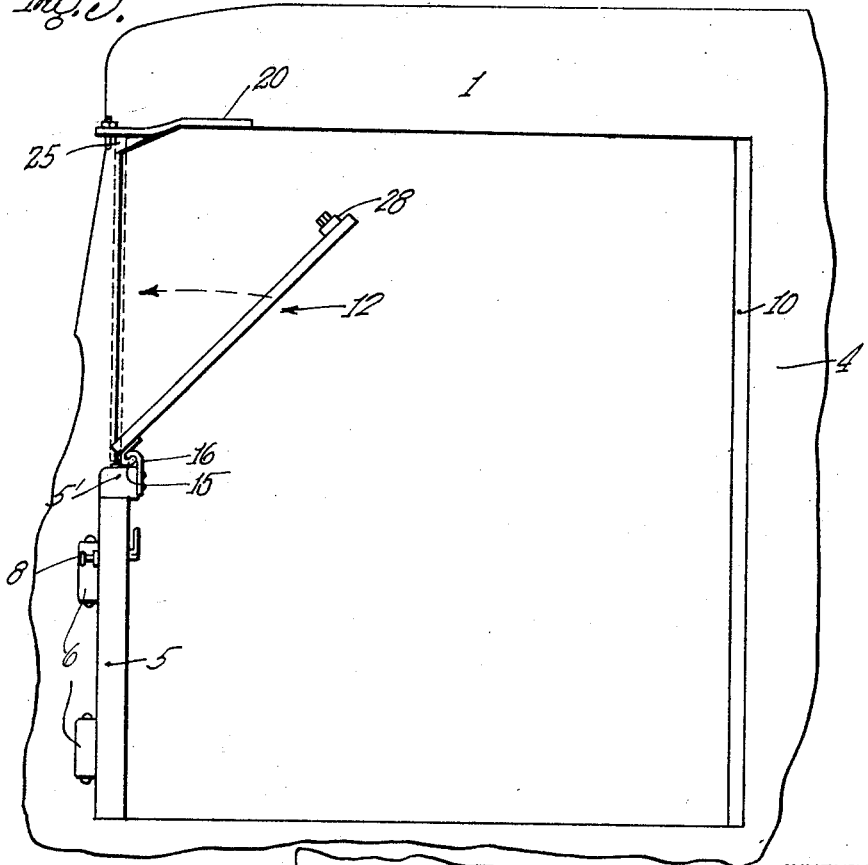
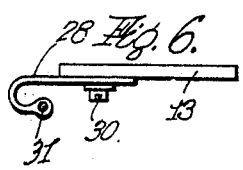
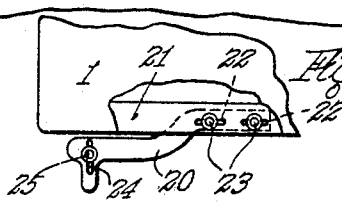
INVENTOR
Hinsdale Smith.
BY Chapin & Neal
ATTORNEYS March 13, 1928.

H. SMITH 1,662,082

DEMOUNTABLE WINDOW

Filed Jan. 5, 1925

INVENTOR

Hinsdale Smith

BY Chapin Neal

ATTORNEYS

Patented Mar. 13, 1928.

1,662,082

UNITED STATES PATENT OFFICE.

HINSDALE SMITH, OF KEYPORT, NEW JERSEY.

DEMOUNTABLE WINDOW.

Application filed January 5, 1925. Serial No. 527.

This invention relates to improvements in demountable windows and is directed particularly to windows adapted to be detachably mounted upon automobiles or the like. One object of the invention is the provision of means whereby the window may be easily and quickly attached or detached from an automobile and is accomplished by the provision of quick acting interlocking or interengaging means carried by the window and automobile that are simple in construction and thereby economical to manufacture.

Another object of the invention is the provision of cooperating means carried by the window and automobile that act as a hinge and that are also adapted to retain the interlocking means in interlocked engagement.

A further object is the provision of means that are adjustable to tension the window against the hinge structure whereby the window and door are held in a rigid relation and allowed to swing as a unit between open and closed position.

The invention is applicable to any type of vehicle where it is desired to provide a demountable window but one use for which I have found it to be particularly adapted is in connection with an automobile. To this end, the invention consists in the novel construction, combination and arrangement of parts hereinafter described and more particularly pointed out in the appended claims. The invention will be readily understood by reference to the accompanying drawings which for descriptive purposes illustrate the embodiment of the invention at present preferred.

In the drawings:

Fig. 1 is a fragmentary side elevational view of an automobile showing the demountable window attached to the door thereof according to my invention;

Fig. 2 is a large scale end elevational view taken on the line 2—2 of Fig. 1;

Fig. 3 is a sectional elevational view taken on the line 3—3 of Fig. 1;

Fig. 4 is a rear elevational view of the door of the automobile showing the interlocking means for fastening the window thereto;

Fig. 5 is a fragmentary elevational view similar to Fig. 1 showing the door in an open position, and the removable window being swung into position;

Figs. 6 and 7 are fragmentary plan views showing the cooperating hinge members that are carried by the door and vehicle;

Fig. 8 is an enlarged sectional elevational view showing an end of the hinge member carried by the vehicle.

Figure 9:
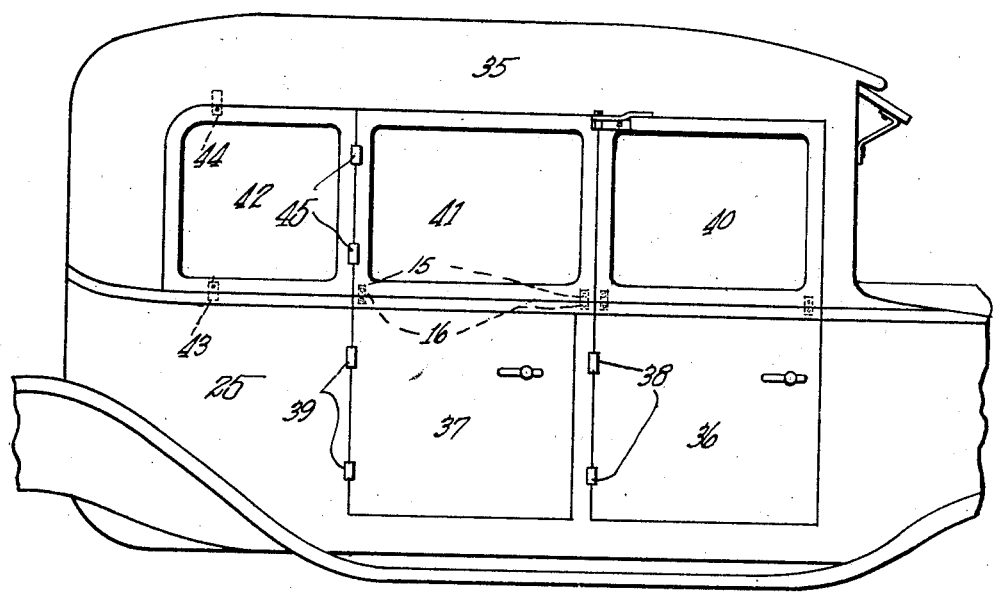
Fig. 9 is a side elevational view of an automobile body showing a window attached thereto according to a modified form of the invention.

Referring to the drawings in detail, the invention will now be described in connection with its adaptation to the swinging door of an automobile, it being understood that it is equally well adapted for use in connection with the stationary panel or other parts of any other vehicle.

So much of an automobile is shown in Figs. 1 and 5 as is necessary to describe the invention and comprises a top portion 1 supported above the cowl 2 by the corner posts 3 in the usual and well known manner. The door opening as usual extends rearwardly from the post to an intermediate portion or post 4 of the automobile.

A door 5 is shown as being hingedly connected to the automobile by means of the hinges 6 which are preferably so disposed that their hinge pintles 7 are in accurate alignment to facilitate a freely swinging movement of the door between open and closed positions. A suitable lock mechanism (not shown) is carried by the door that is provided with the usual outer and inner operating handles or levers 8 and 9. A stop flange 10 of usual construction is fixed to the inner side of the post 4 and acts as a striking flange against which the door and window may strike when moved to and latched in a closed position. This stop as shown comprises a continuous flange strip but any other form may be employed and if desired may be used at the upper and lower side of the door opening as well as at the side as shown.

The structure just described forms no part of the present invention and is shown merely for the purpose of illustrating a form of vehicle with which my invention may be used while the invention comprises the novel combination and arrangement of parts now to be described.

A demountable window sash 12 is provided that is of usual form and preferably comprises a metallic frame 13 in which is properly glazed a light of glass 14. Interlocking devices preferably in the form of hooks 15 and 16 are fixed to the lower and inner side of the window and to the upper rail 5' of the door 5, as shown in Fig. 2. These devices are preferably located adjacent the sides of the window and door but may, if desired, be located at various points intermediate thereof. These interlocking members 15 and 16 are preferably so designed that the window may be hingedly connected thereby to the door, as shown in Fig. 5. When thus hingedly connected to the door, the window may be swung in the direction of the arrow (see Fig. 5) to a substantially vertical position shown by dotted lines wherein the members are so interlocked that they will not become disengaged as will be seen by reference to Fig. 2. A fence 17 (see Fig. 3) of well known form is carried by the upper side of the rail 5' of the door and extends between the hook members 16 thereof and is adapted to dam the space between the top of the door rail and lower side of the window to prevent rain or the like from running beneath the window.

The window is retained in its vertical position by means of adjustable cooperating hinge members 20 and 28 carried by the upper sill 21 of the automobile and frame of the window, respectively, as will now be described. The hinge member 20 preferably comprises a yieldable member as shown in Fig. 7, provided with elongated openings 22 that receive bolts 23 which are in threaded engagement with the sill 21 of the automobile, by the means of which the member 20 is adjustably fixed to the sill. The end of the member is offset outwardly and downwardly as shown (see Figs. 7 and 8) and is provided in its outer end with a slot 24 in which is adjustably carried a downwardly projecting hinge pin or pintle 25.

The hinge member 28 is preferably of bendable metal and is adjustably secured to the window by means of the elongated slot 29 and screw 30 which is in threaded engagement with the window frame. The outer end of this member is preferably formed in the shape of a goose neck as shown in Fig. 6 and is provided with an opening 31 adapted to receive the pin or pintle 25 of the member 20. The end of the member 28 may be bent to move the eye thereof as may be desired while the member may be moved to various positions of adjustment with respect to the window. Thus by suitable adjustments of the members 20 and 28 the pin 25 may be moved to various positions and brought into accurate alignment with the axis of the hinges 6, thereby allowing a freely swinging movement of the window with the door.

Adjusting screws or wedge members 34 for tensioning the window are provided which are in threaded engagement with the rail 5' of the door and are adapted to abut the lower side of the window frame. These are preferably so adjusted that the window frame strikes thereupon before it reaches its final vertical position, as shown by dotted lines in Fig. 5, thereby tending to limit the movement of the window and creating a strain on the window frame, as it is moved to its position for the engagement of the hinge members 20 and 28. By thus straining or springing the window into place, the hook members 15 and 16 are held firmly in interlocked relation, thereby preventing any tendency for the window to rattle on the door and providing a substantially rigid, unitary, swinging structure including the door 5 and demountable window 12. The window may be easily detached from the door by raising the yieldable member 20 thereby withdrawing the hinge pin 25 from the hinge member 28 which allows the window to swing rearwardly for disengagement from the members 15 and 16.

A modification of the invention will now be described with particular reference to Fig. 9 in which is shown the body portion 25 of an automobile having doors 36 and 37 hinged thereto at 38 and 39. A demountable window 40 similar to that already described is shown as being attached to the door 36 after the manner previously described while the windows 41 and 42 are detachably mounted upon the door 37 according to the form of the invention now to be described.

The window 42 is hingedly connected to the window 41 by means of the hinges 45 and is arranged in the usual manner to swing on a vertical axis. The window 41 is hingedly connected to the door 37 by means of the devices 15 and 16 as previously described and shown in Fig. 2, whereby the window may swing on a horizontal axis. Suitable strap devices 43 and 44 are employed to detachably secure the window 42 in place upon the automobile as shown in Fig. 9. When the window 42 is so held the devices 15 and 16 of window 41 are retained in interlocked engagement so that the door 37 and window 41 may swing as a unit upon the hinges 39 and 45 between open and closed position. To detach the windows, the devices 43 and 44 are first disconnected which permits the window 42 being swung upon hinges 45 to overlie the window 41, after which the two windows are swung as a unit downwardly for disengagement from the devices 15 and 16.

From the foregoing, it will be observed that the window is attached to the door of the vehicle either singly or associated with a second window by the interengagement of the interlocking devices between the window and door, while other cooperating devices are provided that retain the interlocking devices in engagement and permit a free swinging movement of the door and window. Also, the employment of adjusting means render it possible to tension the window and thereby exert a pressure against the interengaging means to provide a rigid and strong hinged structure comprised of the door and window detachably mounted thereon.

Many changes may be made in the form of the invention without departing from the scope thereof. I therefore prefer to be limited by the following claims rather than the foregoing description.

What I claim is:

1. The combination with a vehicle body having a door hinged thereto, of a demountable window, interlocking devices carried by said window and door adapted when in interlocked engagement to prevent a relative vertical separating movement thereof, a hinging device carried by said window and a part of said vehicle adjacent thereto for hingedly connecting said window to said vehicle to permit opening and closing of said door and window as a unit.

2. The combination with a vehicle body having a door hinged thereto, of a demountable window, interlocking devices carried by said window and door adapted when in interlocked engagement to prevent a relative vertical separating movement thereof, a hinging device carried by said window and a part of said vehicle adjacent thereto for hingedly connecting said window to said vehicle to permit opening and closing of said door and window as a unit, and adjustable tension devices associated with said window acting to create a strain on said window between the interlocking devices and hinged devices for retaining said window in rigid relation with respect to said door.

3. The combination with a vehicle body having a door hinged thereto, of a demountable window having a rigid sash, interengaging devices on said sash and door for detachably connecting the lower side of said window to the top of said door, and a hinging device for connecting the upper portion of said sash to said vehicle body to permit opening and closing movement of the door and window as a unit, adjustable tension devices arranged to create a strain on said window sash between the upper and lower connections for retaining said window in rigid relation to said door.

4. The combination with a vehicle body having a door hinged thereto, of a demountable window having a rigid sash, interhooking devices on said sash and door for detachably connecting the lower side of said window to the top of said door, and a hinging device for connecting the upper portion of said window to said vehicle body to permit opening and closing movement of the door and window as a unit, adjustable tension devices comprising wedging members between the lower edge of said sash and said door, arranged to create a strain on said window sash between the upper and lower connections for retaining said window in rigid relation to said door.

5. The combination with a vehicle body having a door hinged thereto, of a demountable window therefor having a rigid sash, hook members carried by the door and sash adapted for interengagement and arranged to permit the window to be swung downwardly for disengaging said hook members, wedge members between the door and sash tending to limit the swinging movement of the window to its upright position, hinge members carried by the sash and vehicle body adapted, when interconnected, to hold the sash against the wedge members and arranged to permit the opening and closing movement of said door and window as a unit.

6. The combination with a vehicle body having a door hinged thereto, of a demountable window therefor having a rigid sash, hook members carried by the door and sash adapted for interengagement and arranged to permit the window to be swung downwardly for disengaging said hook members, wedge members between the door and sash tending to limit the swinging movement of the window to its upright position, hinge members carried by the sash and vehicle body adapted, when interconnected, to hold the sash against the wedge members and arranged to permit the opening and closing movement of said door and window as a unit, the said hinge members being arranged for independent adjustment whereby the pivotal axis thereof may be made to align with the axis of the hinges of the door.

7. The combination with a vehicle body having a door hinged thereto, of a demountable window, interengaging members carried by the door and the window arranged to permit the window to be swung downwardly for disengaging said members, hinge members carried by the window and a part of said vehicle adjacent the window adapted when interconnected to hold the engaging members in engagement and adapted to permit the door and window to swing as a unit.

In testimony whereof I have affixed my signature.

HINSDALE SMITH.